United States Patent Office 3,218,725
Patented Nov. 23, 1965

3,218,725
ALTERNATE VACUUM FREEZE AND HEAT
DEHYDRATION OF FOOD PRODUCTS
Frank G. Lamb, American Falls, Iowa, assignor to Lamb-Weston, Inc., Weston, Oreg., a corporation of Oregon
No Drawing. Filed Mar. 19, 1962, Ser. No. 180,797
6 Claims. (Cl. 34—5)

This application is a continuation-in-part of my co-pending application, Serial No. 157,956, filed December 8, 1961, entitled, "Process for Vacuum Dehydro-Freezing of Foodstuffs."

This invention relates to a process of dehydration utilizing a sequence of steps wherein the product under consideration is first subjected to vacuum dehydration to partially dehydrate and then freeze, after which the product is then dried exteriorly of the vacuum zone by air drying of known and suitable types.

Preferably, the vacuum phase is so performed as to freeze the product by lowered pressure after dehydration, such freezing by additional lowering of the vacuum taking advantage of the inherent heat of fusion of the product as it progresses from its freeze point, or slightly above freezing, to its frozen state. Preferably also, this vacuum dehydration-freeze phase is accomplished in a manner that reduces, if not entirely eliminates, cellular damage to the product during the freeze cycle. This is done by holding the product under vacuum, prior to freezing thereof, at such pressure that the resultant temperature of the product is slightly above freezing, and so holding the product under this degree of temperature for that period of time sufficient to dehydrate the product at least from 3% to 10% of its original moisture content, thereby providing expansion space for the ice formed as the result of subsequent lowered pressure application (e.g., 1 to 2 mm. of mercury) for freezing the product.

There are various known procedures for the drying of feed products aimed at both the concept of partial or full dehydration. Such procedures may involve applications of hot air by various methods. However, the usual and undesirable result of hot air drying alone resides in a shriveling of the product, at least where moisture reduction is accomplished down to the 50% point, i.e., 50% removal of the original moisture content of the product. Products of such an air drying process are commonly accompanied by a severe loss of rehydration ability. This is because the product becomes shriveled, and in such a state, reabsorbs water upon rehydration appreciably more slowly and to a lesser degree than a product which remains, although dehydrated, unshriveled. Furthermore, known methods of air drying, because of this same factor, are disadvantageous in that as the product gets drier and more shriveled, moisture removal becomes correspondingly more difficult and slower. In fact by the time the product in such methods has had most of its moisture removed and is down to 15% or 20% moisture in the remaining weight of the product the process becomes so inefficient that most commercial dehydration reverts to what is known as "bin drying."

The latter type of procedure involves the placing of a relatively large amount of product, e.g., 2,000 pounds, in a large bin provided with an open top and a screened or perforated bottom through which hot air can be projected. In the course of this treatment the point is soon reached where the air going through the product to remove the heat must necessarily be cooler than the air used in the first stages of the air drying process. Hence, the result is that at the very time the moisture in the product becomes more difficult to remove, the only means for further removal resides in a less effective method. This is because whereas relatively hot air can be used in the first stage of the method since the evaporative effect of the moisture at that stage keeps the product relatively cool, as such moisture becomes less the cooling effect of that evaporation is reduced. Therefore, cooler air in the later stages of bin drying must be used than the air utilized in the first stages thereof. The total time in such procedures is excessive—15 or 20 hours being common. The resultant product is often so shriveled, and case-hardened as well, as to prevent reconstitution to not more than 70% or 80% of the original undehydrated volume and weight.

Other methods have been proposed whereby dehydration in a vacuum forms the basic procedure. Here also difficulties are encountered: once the maximum amount of heat has been extracted from the product through vacuum, further evaporation or dehydration will not take place without the addition of more heat. Accomplishing this, to date, has been a difficult and expensive matter—i.e., to inject more heat into a food product while the latter is under vacuum. Methods such as radiant and dielectric heat, ultra-high frequency wave motion, etc., have been tried to this end but without ultimate and real success. The result is that the industry has today become centered around the use of the hot-tray type of heat application. Here trays, heated by some means such as hot water, are used to support the product within the vacuum. The method involves the inherent difficulty that although a portion of the heat so radiated is transmitted into the product by conduction, once the contacting surface of the product has become dehydrated, it automatically becomes a very efficient insulation material precluding further even drying throughout the remaining mass. Although the product does not shrivel while under vacuum, the hollow cells thereof become bone dry with a resultant extremely low heat conductivity. With the limitation upon the amount of heat that can be applied at this stage, as above indicated, the consequence is that the drying of the center of the material, if at all possible, represents a slow process extending over many hours.

The instant invention, in its proper utilization of multiple phases of predetermined degrees of vacuum and proper combining with an air dehydration or drying phase that takes place outside of the vacuum zone, recognizes and appreciates these difficulties of known procedures and presents an oriented sequence of steps which result not only in proper, even drying without shriveling, but result also in retention, to a large and substantial extent, of the cellular organization or framework within the fibers or mass of the given product. The latter is conducive to the attainment of a properly dehydrated product (irrespective of the degree of dehydration) which will more efficiently reconstitute and with such reconstitution, will more nearly duplicate the original texture, taste, appearance and other qualities inherent in the natural product before treatment. The invention also enables efficient dehydration down to any predetermined degree, i.e., moisture removal of up to about 95% of the original moisture content of the given food product.

It is accordingly a primary object of the instant invention to provide a process wherein, by alternate vacuum-freezing-dehydration and air dehydration steps, a given food product is effectively reduced in over-all moisture content to any predetermined degree evenly, thoroughly, and, in the preferred embodiment of the invention, without substantial damage to the inner cellular framework of the said product.

It is a further object of the invention to provide a cycle or sequence of process steps wherein vacuum dehydration and freezing are alternately employed with air drying in such manner that the referred to dehydration can be carried through to any predetermined and desired limits within, for example the range of from about 30% to about 95% removal of the original moisture content of the product.

Another objective of the invention is to provide a procedure which contemplates dehydration in the manner hereinbefore briefly described wherein the product is not only not shriveled or case-hardened as a result thereof, but also, due to proper vacuum treatment control, has a relatively smooth and natural external appearance, despite being dehydrated to a substantial and appreciable extent.

It is a further object of the invention to provide a dehydration-freeze procedure wherein the above-described combination of vacuum-freeze drying and alternate steps of air drying result in a significant time saving as compared with ordinary vacuum dehydration utilized by itself or as compared with known air or vacuum drying of the types generally employed today. In conjunction with this time saving factor the instant procedure, as stated, has the further advantage of eliminating substantial shriveling of the product and of accomplishing an evenness of dehydration through the given quantity of product, a function and result heretofore unobtainable by the known methods herein referred to.

Finally, it is a further object and advantage of the present process to produce an end product which reconstitutes, upon hydration, far more quickly and, having in mind the substantial preservation of the natural cellular formation of a given product, an end product which is a better dehydrated product, not only from the viewpoint of maximum retention of taste, appearance and other essential qualities, but a product which also fulfills the ultimate and desired requisite: ease of reconstitution, and reconstitution to a more complete and satisfactory extent.

Other objects and advantages to be obtained through the use of this invention will be apparent from the more detailed description thereof which follows.

The invention may be summarized as involving these essential phases:

Firstly, subjection of the product to a vacuum of that magnitude which will partially dehydrate the product to at least 3% to 10% of its original moisture content, which magnitude of vacuum is preferably of that degree that will lower the temperature of the product to the freeze point but not reduce the temperature thereof to below said freeze point. In the practice of the invention it is preferred that the vacuum employed in this vacuum dehydration step be of the order of about 4.6 mm. of mercury. At this reduced pressure the product temperature will be lowered to about 32° F., or just above, and the product will remain unfrozen.

Secondly, and in the preferred embodiment of the invention, the product is permitted to remain at this predetermined amount of reduced pressure for a period of time to accomplish the desired amount of dehydration. As set forth in more detail in my copending application filed Februray 9, 1962, Serial No. 172,332, the purpose of holding the product at this temperature and pressure for a designated period of time is to remove at least, as the required minimum, that amount of moisture which will permit subsequent freezing without cellular damage. Removal of at least 10% of the original moisture content will assure expansion space for the ice formed when the temperature is reduced to below freezing by further reduction of pressure. Where the primary objective is dehydration rather than mere freezing, in contrast to the aforesaid copending application, then of course the vacuum, in this pre-dehydration phase, is applied for a maximum or optimum period to withdraw a maximum amount of moisture from the product. This would be true of the instant invention where dehydration of the product in a predetermined amount, rather than mere freezing thereof and that alone, is the main objective.

Thirdly, after the so-called "wait period" for at least that period of time to permit subsequent freezing without damage and preferably, in this instance, to remove the maximum amount of moisture, the vacuum is broken and the product removed from the vacuum zone. It is then subjected to air drying or drying by other appropriate methods. The latter are preferably of that type, such as the belt type of method where dehydrated air is forced into the product through an open-mesh type of carrier. In this method the expanded, predehydrated product is tossed about or subjected to sufficient agitation so that the dehydrating medium penetrates the entire body of the product, resulting in an evenness of drying throughout. Such a drying technique is facilitated, in this instance, by the very nature of the product which is now being treated: due to the initial vacuum phase the product has become expanded, a natural consequence of vacuum imposition. The loss of moisture while the product is undergoing the vacuum phase not only eliminates the referred to shriveling thereof but also causes the product to be actually slightly expanded due to the high vapor pressure inside the product in relation to the surrounding atmospheric pressure in the vacuum. Also the escaping moisture, due to the vacuum dehydration, actually creates minute passageways which would otherwise be closed off by shriveling, but which in this case are open and available as paths for moisture escapement in the air drying step of this phase. In this latter stage, air drying is continued until the predetermined amount of moisture has been removed from the product, to whatever degree is desired.

Fourthly, since it is obvious that air drying as just mentioned warms the product to a significant degree dependent upon the temperature of the air utilized and the length of time of application thereof, it may be preferable to subject the product to one or more additional vacuum-freezing stages as set forth above. This would be particularly true if the product is to be ultimately distributed, not simply as a dehydrated, dry material, but as a dehydro-frozen product. In such event the same procedure is followed as in step 1, supra—the product is readmitted to the vacuum zone in its warm state (due to the air drying phase), vacuum is applied to lower the temperature to the freeze point without freezing for a period of time to further dehydrate to the desired degree, then lowered sufficiently to ultimately freeze the material. This is accomplished by pressure decrease to from about .2 to 5 mm. of mercury pressure. The product is now dehydro-frozen and can be placed in permanent cold storage without further application of other freezing methods.

It is thus to be understood that the present invention contemplates alternate steps of vacuum dehydro-freezing and air drying. Accordingly, as will be seen, these steps can be repeated any number of times so as to, by such repetition, progressively dehydrate the product until the same has practically all moisture removed, or until the same has reached what has been predetermined as a desirable amount of dehydration. Also, the process is suitable as a means of obtaining a fully dehydrated product, it being understood that one mode of doing so involves vacuum predehydration followed by air drying to its completion exterior to the vacuum zone.

In practicing the process it will be appreciated that the initial temperature of the material to be treated will have a substantial effect upon the amount of moisture which is removed during the vacuum cycle. Quite obviously, if the final product is to be distributed as frozen, and reconstituted as a fresh, uncooked or otherwise untreated product, then generally speaking the material is placed under vacuum at ambient or room temperature. Such products as, for example, strawberries will be so treated at a starting temperature of, e.g., 80° F. On the other hand, any fruit, vegetable, etc., that needs to be blanched or precooked for various reasons, if placed into the vacuum zone immediately following blanching, will have a temperature of, e.g., 200° F. Similarly, cooked foods will also be admitted to the vacuum zone at their highest preparation temperature of slightly less than boiling or, e.g., at about 200° F.

This increased ingoing temperature of the product has a substantial effect upon the amount of dehydration that will occur during the vacuum cycle, as can be observed from the fact that a product having an 80° pulp temperature will have less evaporative moisture in the vacuum drying stage than a product having a pulp temperature of 200° F. This is because there is 120° (200 minus 80) less units of specific heat available in the colder product, such temperature differential representing, in other words, about 120 B.t.u.'s per pound of water in the product less available to vaporize the moisture therein. Most fresh food products as fresh vegetables, fresh fruits, etc., will fall in the range of from about 75% to 85% moisture in their raw state. Accordingly, a product with about 80% moisture content, when placed under vacuum at, e.g., 80° F. will lose approximately 15 to 18% moisture. On the other hand, a cooked or blanched product placed under vacuum at a temperature of, e.g., 200° F. will lose about 25% of its original moisture content during both stages of the vacuum cycle and assuming that pressure in the final freeze stage is lowered to about 1 mm. of mercury.

Those skilled in the art will readily appreciate the mathematical or theoretical background herein adduced enabling estimate of the amount of expected moisture removal from a given product due to subjection of the product to one or more complete cycles of treatment as herein set forth.

For example, 100 pounds of a typical food product may contain about 20 pounds of solids and 80 pounds of water. This would roughly approximate the solid-water content or ratio of most fresh vegetables. It may be assumed that 1 B.t.u. is required to raise 1 pound of water 1° F. while in the liquid stage and very close to 1 B.t.u to raise a pound of ice 1° F. As a practical matter, it may then be said that about 1 B.t.u. per pound of water is available for every degree of Fahrenheit temperature between the starting temperature and the temperature below freeze point of the product in the vacuum. At 1 mm. mercury of pressure the temperature of the product will be reduced to about 0° F. The 100 pounds mentioned of the assumed product, placed in a vacuum at 1 mm. of mercury will thus represent about 200 B.t.u.'s available from 200° F. to 0° F. plus about 144 B.t.u.'s available to physically change the product from its 32° F. unfrozen stage to 32° F. frozen state. The total thus represents 344 B.t.u.'s available for each pound of water in the product and for the assumed 80 pounds of water therein, a total of some 285,520 B.t.u.'s available in the 100 pounds of product. It may also be assumed, as a generalization, that approximately 1,000 B.t.u.'s are necessary to sublime and boil off the stated amount of water through the range of pressures here under consideration; therefore, theoretically, some 28 pounds of water should be boiled off from the pulp temperature heat available in the product as it first enters the vacuum zone (285,520 divided by 1,000). In practice, actual experimentation demonstrates that approximately 20 to 25 pounds of water will be evaporated under the conditions here outlined.

Similarly, if the ingoing temperature of the product is less than the assumed 200° F. as, for example, 80° F., the amount of achieved moisture removal will be appreciably less. Assuming an 80° ingoing temperature of the same product, and based upon similar calculations, it will appear that approximately 224 B.t.u.'s per pound are available, which times the 80 pounds of moisture in the 100 pounds of product results in the mathematical expectation of 17.9% moisture removal (17,920 divided by 1,000 B.t.u.'s per pound). Here again, experimentation demonstrates that the range of moisture removal will, as a practical matter, average from between 12% to 15% rather than the mathematical expectation of 17.9%.

It is thus seen that the invention is primarily concerned, as heretofore indicated, with a process which utilizes the sensible heat of the product and the heat of the fusion of the water (or involved water solution) in the product to dehydrate the product in the vacuum phase of the procedure. The following further explanation is demonstrative of this:

If a given product such as fresh green peas are removed from a blancher at 200° F. and subjected to a reduced pressure of about 4.6 mm. of mercury the heat that is in the product will vaporize the water in the product into the surrounding low pressure atmosphere. At the same time the product temperature is reduced until equilibrium is reached at about 32° F. In this instance, for each pound of water in the initial product there will be 168 B.t.u.'s of heat available to evaporate the water content (200° minus 32° equals 168°). An acceptable and average value of 1,050 B.t.u.'s per pound of water will here be assumed. Evaporation during this temperature reduction (200° to 32°) should produce .16 pound of water (168 divided by 1,050) evaporated per pound of water originally in the product. Theoretically, an additional amount of water of about 5% should be evaporated due to the heat in the solid matter of the product but generally, this will be relatively insignificant.

The immediate preceding paragraph has to do with temperature reduction to the freeze point. Returning to the concept of the instant process, if the product is then subjected to even lower pressures (e.g., a pressure of 1 mm. of mercury will reduce the temperature to about 0° F.), the product on freezing will give up 144 B.t.u.'s for each pound of ice formed.

As herein characterized this is referred to as the heat of fusion. Here using 1,075 B.t.u.'s as the amount of heat required to evaporate a pound of water at 32° F., such amount will theoretically be .134 pound per pound of water at 32° F. (144 divided by 1,075).

The present process contemplates repetition of this cycle through the vacuum and ultimate freeze stage. Hence if after freezing by application of low pressure the product is thawed and heated to its original temperature (here assumed to be 200° F.), again subjected to the low pressure treatment as hereinbefore described, it will undergo further dehydration. Such a cycle of subjecting the product to a vacuum until frozen, then thawing by application of heat (here the heat derived from an appropriate air drying step) can be repeated, each time causing dehydration of the product an additional amount. In most instances, but again depending upon the purposes of the treatment, one complete repetition of the vacuum cycle will be sufficient to substantially dehydrate the product if the same goes into the vacuum at an elevated temperature. This of course may not hold true where certain fresh products, such as strawberries, would obviously be treated at no higher temperature than ambient or room temperature. In this instance, as may be gathered from the foregoing explanation of the involved principle, less B.t.u.'s are available for water removal as the step is repeated and hence removal in each repeated cycle is in less amount.

Empirical formulae will indicate how much dehydration can be obtained with respect to any given product during the vacuum freeze cycle. The following calculations indicate that only the specific heat of the solid or food product and the approximate moisture content thereof need be known. With this information the amount of moisture retention and corresponding moisture removal during the two phases of the vacuum-freeze can be computed. The mentioned two phases comprise: Phase A relating to vacuum dehydration down to the freeze point of the product, and Phase B, directed to further dehydration and freezing of the product at pressures inducing temperatures below the freeze point.

The following calculations are based upon these determined factors:

Specific heat of solids (here fresh peas) = 0.25
Specific heat of water = 1.00
Heat of vaporization = 1050 B.t.u./lb.
Heat of fusion = 144 B.t.u/lb.

100 lbs. product at 80% moisture (20 lbs. solids, 80 lbs. water) and at 92° F., the freezing point of the product is 32° F.

Product temperature is lowered 60° F. (by vacuum) to such freezing point.

PHASE A (Moisture removed down to freeze point)

Lbs. water evaporated in cooling product 60° F. (92° to 32° F.) =

$$\frac{(\text{specific heat of solids}) \times (\text{° F. change in solids})}{(\text{heat of vaporization of water})} \times$$

(lbs. solids) +

(This calculation remains constant for each cycle, if same is repeated.)

$$\frac{(\text{specific heat of water}) \times (\text{° F. change water})}{(\text{heat of vaporization of water})} \times$$

(lbs. water in product. This value changes for each cycle.) =

$$\frac{(0.25 \text{ B.t.u./lb.}) \times (60° \text{F.})}{1050 \text{ B.t.u./lb.}} \times (20 \text{ lbs.}) +$$

$$\frac{(1.0 \text{ B.t.u./lb.}) \times (60° \text{F.})}{1050 \text{ B.t.u./lb.}} \times (80 \text{ lbs.}) =$$

0.29 lb. + 4.57 lbs. = 4.86 lbs.

Lbs. water remaining in product = (80.00 − 4.86) = 75.14 lbs.

Percent of original moisture removed: about 6%.

PHASE B (Moisture removed below freeze point)

Lbs. water evaporated due to heat of fusion released as product is frozen =

$$\frac{(\text{heat of fusion of water})}{(\text{heat of vaporization of water})} \times \begin{array}{l}\text{(lbs. of water remaining} \\ \text{in product. This value} \\ \text{changes each cycle.)}\end{array}$$

$$= \frac{(144 \text{ B.t.u./lb.})}{(1050 \text{ B.t.u./lb.})} \times (75.14 \text{ lbs.}) = 10.30 \text{ lbs.}$$

Lbs. water remaining in product = (75.14 − 10.30) = 64.84 lbs.

Percent of original moisture removed: about 18%.

The foregoing computations, illustrating expected moisture removal through the two phases of dehydration down to the freeze point and dehydration below freezing are typical of the manner by which estimates of amount or percentage of dehydration may be obtained should the cycle represented by Phase A and Phase B be repeated. Of course these two phases, in the instant process, are followed by the further dehydration, e.g., air dehydration, step after the product has been withdrawn from the vacuum zone. After such air dehydration to a predetermined extent the product will contain appreciably less moisture than it had at the beginning of the initial cycle. Accordingly, the proportionate amount of over-all percentage removal (as a comparison with the original moisture content) will be less on repetition of the cycle represented by Phases A and B. Nevertheless the computations are applicable to such further, alternate procedures, once the moisture content of the starting material at any given cycle in the process has been determined.

The following Table I is an enumeration of the effects of repetition of a series of A and B cycles, as hereinbefore described, used in conjunction with an intermediate step in between such cycles. Such intermediate step, as represented in this table, does not involve substantial air dehydration, as such is visualized as a part of the instant invention. However, the chart is illustrative of the significant and substantial dehydration that is obtainable by a repetition of only the dehydro-freeze cycles where intermediate the same the product is warmed back to its ingoing temperature.

In other words in the example used in the chart fresh peas are the product being treated, the same product under the same conditions as set forth with respect to the above calculations. That is, such product consists of 80% moisture, has an ingoing temperature of 92° F. and a freeze point of 32° F.

The chart depicts the results, as computed in the foregoing, of following each vacuum dehydration step (Phases A and B) with a heating stage whereby the product, by subjection to warm air, is heated back to its final ingoing temperature (92° F.). Air dehydration during such temperature increase is not here taken into account.

In other words, the following figures of the table demonstrate that even without substantial intermediate air dehydration, which will significantly, as per this invention substantially reduce the time of treatment, the product can be substantially dehydrated through the combination of repeated steps wherein both the heat of vaporization and the heat of fusion are employed to their fullest extent, thus enabling vacuum treatment to withdraw any predetermined degree of moisture from the product.

TABLE I

| Cycle | Step | Lbs. water evaporated | Lbs. water remaining | Percent weight reduction (accumulated lbs. water evaporated) | Percent remaining moisture in product |
|---|---|---|---|---|---|
| 1 | A | 4.86 | 75.14 | 4.86 | |
|   | B | 10.30 | 64.84 | 15.16 | 76.5 |
|   | A+B | 15.16 | | | |
| 2 | *C | | | | |
|   | A | 4.00 | 60.84 | 19.16 | |
|   | B | 8.34 | 52.50 | 27.50 | 72.4 |
|   | A+B | 12.34 | | | |
| 3 | C | | | | |
|   | A | 3.29 | 49.21 | 30.79 | |
|   | B | 6.75 | 42.46 | 37.54 | 68.0 |
|   | A+B | 10.04 | | | |
| 4 | C | | | | |
|   | A | 2.71 | 39.75 | 40.25 | |
|   | B | 5.45 | 34.30 | 45.70 | 63.2 |
|   | A+B | 8.16 | | | |
| 5 | C | | | | |
|   | A | 2.25 | 32.05 | 47.95 | |
|   | B | 4.40 | 27.65 | 52.35 | 58.0 |
|   | A+B | 6.65 | | | |
| 6 | C | | | | |
|   | A | 1.87 | 25.78 | 54.22 | |
|   | B | 3.54 | 22.24 | 57.76 | 52.7 |
|   | A+B | 5.41 | | | |
| 7 | C | | | | |
|   | A | 1.56 | 20.68 | 59.32 | |
|   | B | 2.84 | 17.84 | 62.16 | 47.2 |
|   | A+B | 4.40 | | | |
| 8 | C | | | | |
|   | A | 1.31 | 16.53 | 63.47 | |
|   | B | 2.27 | 14.26 | 65.74 | 41.6 |
|   | A+B | 3.58 | | | |
| 9 | C | | | | |
|   | A | 1.11 | 13.15 | 66.85 | |
|   | B | 1.80 | 11.35 | 68.65 | 36.2 |
|   | A+B | 2.91 | | | |
| 10 | C | | | | |
|   | A | .94 | 10.41 | 69.59 | |
|   | B | 1.43 | 8.98 | 71.02 | 31.0 |
|   | A+B | 2.37 | | | |

TABLE I—Continued

| Cycle | Step | Lbs. water evaporated | Lbs. water remaining | Percent weight reduction (accumulated lbs. water evaporated) | Percent remaining moisture in product |
|---|---|---|---|---|---|
| 11 | C | | | | |
|  | A | .80 | 8.18 | 71.82 | |
|  | B | 1.12 | 7.06 | 72.94 | 26.1 |
|  | A+B | 1.92 | | | |
| 12 | C | | | | |
|  | A | .69 | 6.37 | 73.63 | |
|  | B | .87 | 5.50 | 74.50 | 21.8 |
|  | A+B | 1.56 | | | |
| 13 | C | | | | |
|  | A | .62 | 4.88 | 75.12 | |
|  | B | .67 | 4.21 | 75.79 | 17.4 |
|  | A+B | 1.29 | | | |
| 14 | C | | | | |
|  | A | .53 | 3.68 | 76.32 | |
|  | B | .50 | 3.18 | 76.82 | 13.7 |
|  | A+B | 1.03 | | | |
| 15 | C | | | | |
|  | A | .47 | 2.71 | 77.29 | |
|  | B | .37 | 2.34 | 77.66 | 10.5 |
|  | A+B | .84 | | | |
| 16 | C | | | | |
|  | A | .42 | 1.92 | 78.08 | |
|  | B | .26 | 1.66 | 78.34 | 7.6 |
|  | A+B | .68 | | | |
| 17 | C | | | | |
|  | A | .39 | 1.27 | 78.73 | |
|  | B | .17 | 1.10 | 78.90 | 5.2 |
|  | A+B | .56 | | | |
|  | C | | | | |

\* Heat to ingoing temperature: Intermediate step—product removed from vacuum zone and warmed to initial ingoing temperature —92° F. as set forth supra with regard to dehydration computation.

As indicated in the foregoing, the success of the instant invention in large part depends upon full appreciation of this factor, that it is of primary importance that all of the available units of heat present in the product by reason of the moisture therein, and represented by the amount of moisture therein, be utilized to the fullest extent in the dehydration procedure. Hence the procedure contemplates not merely dehydration by vacuum but vacuum dehydration wherein those heat units available both prior to freezing and during the freezing be completely utilized.

The calculations of Table I also represent repeated vacuum-freeze cycles wherein only sufficient vacuum has been used to freeze the product. The table demonstrates, in other words, that where the preferred features of this invention be employed, i.e., intermediate and substantial air dehydration, dehydration can be accomplished more rapidly, efficiently and with a minimum of alternate vacuum dehydration and air dehydration steps.

The following examples of the practice of the invention are illustrative only and not to be considered as confined to the precise food products herein referred to. In other words the process is applicable without restriction to almost any type of food product, particularly those which have a porous exterior, it being appreciated that some foods, such as grapes and peas, preferably have their skins punctured for ready access to the interior thereof in order for the vacuum procedure to have its desired effect.

*Example I*

A quantity of fresh peas are slit and placed within a vessel able to withstand internal and external pressures of about 20 p.s.i. The vessel is constructed with a 100-pound capacity.

The vessel is pressure sealed and steam introduced until the peas reach a temperature of between 200 to 212°, and that temperature maintained for a period of about 5 minutes. Such steam treatment blanches the peas and also introduces an amount of heat beneficial in the next step, consisting of vacuum application.

The steam is turned off and a vacuum applied to the interior of the vessel in an amount of 4.6 mm. mercury pressure. The charge is submitted to such vacuum for a period of about 8 minutes, the temperature being reduced during this period of time to about 33° F.

The vessel is kept at this pressure and the charge maintained at the stated temperature for a period of about 10 minutes. At the end of this time, the peas are dehydrated or moisture removed therefrom, in an amount of about 15% of the original moisture content. The purpose of the instant step in the procedure is not only to obtain sufficient dehydration but, as a result of such dehydration to thereby provide sufficient space for the expansion of the residual water when it is frozen by the next quick freeze phase.

The pressure is then reduced to 1 mm. of mercury, such reduced pressure lowering the temperature of the product to 0° F.

Pressure is then increased to normal and the product removed from the vacuum zone. It is then subjected to air drying at a temperature of about 180° F. which air is passed through the product by known media. When the product reaches approximately the said air temperature it is then again placed in the vacuum zone, and vacuum applied of the same order—4.6 mm. of mercury. The product is again subjected to such lowered pressure for a period of 8 minutes at the end of which period pressure is lowered to 1 mm. of mercury and the product again frozen. It is then removed from the vacuum zone and placed, as a dehydro-frozen product, into permanent cold storage.

*Example II*

Twenty-five pounds of potatoes are peeled, washed, diced into quarter-inch cubes, and precooked in a conventional manner.

This product, at a temperature of about 200° F., is then placed in the vacuum chamber and pressure applied in the order of about 4.6 mm. of mercury. At this vacuum the temperature of the product is reduced, in about 5 minutes, to a temperature of about 33° F. The stated pressure is maintained for a period of 10 minutes. The amount of moisture reduction during this "wait period" while under vacuum is about 15% of the original moisture content of the product.

After such vacuum treatment at the stated pressure for the stated period of time the applied pressure is further lowered to about 1.4 mm. of mercury, the result being to rapidly lower the temperature of the product to 5° F. in a period of about 5 minutes. This results in additional moisture removal to the extent of about 12%, the total moisture removal of the two vacuum stages thus amounting to 27% of the original moisture content of the product.

The product is then removed from the vacuum zone and placed upon a belt drier of known type where it is subjected to the drying temperature of air at a temperature of 180° F. After the product has been subjected to such air drying for a period of 15 minutes, it is then replaced in the vacuum zone and the initial step repeated: pressure is first reduced to 4.6 mm. of mercury; the product is maintained at this pressure for a period of 10 minutes; the pressure is then reduced to 1.4 mm. of mercury the result being, again, to lower the temperature of the product to 5° F. The product is now frozen and in this state removed from the vacuum chamber and placed in permanent deep freeze storage.

Example III

Fifteen pounds of cleaned, stemmed and fresh strawberries are placed in a vacuum chamber. The pulp of the product is at room or ambient temperature of 80° F. Starting with the first phase of the first cycle, the strawberries are subjected to a vacuum pressure of 4.6 mm. mercury. This reduces the temperature of the strawberries to 33° F. in about 5 minutes. The charge is permitted to stand in this reduced pressure zone for a period of an additional 8 minutes.

After such period, during which about 5% of the original moisture content is removed from the product due to the imposition of vacuum, the pressure is lowered to about 1 mm. mercury. This will, in about 8 minutes, lower the temperature of the product to about 0° F., at which point it is solidly frozen.

The vacuum is broken and the product removed from the vacuum zone and subjected to a thawing, dehydrating air flow until the product is raised to a temperature of about 80° F., the original starting temperature thereof. The strawberries are then replaced in the vacuum zone and the initial cycle repeated: subjection to vacuum pressure of 4.6 mm. for a period of about 13 minutes; then subjection to lowered pressure of about 1 mm. for an additional period of about 10 minutes. The product is by this last step solidly frozen; the vacuum is then broken, and the product removed from the vacuum zone and placed in permanent deep freeze storage.

It is of course to be understood that the foregoing examples are representative only. The dehydro-vacuum-freeze phases can be repeated more than the two times herein typified, in which case the air-drying step is alternately employed for as many complete cycles as are desired. Obviously the more repetitious these procedures the more dehydrated the final product becomes.

Almost any type of food product can be satisfactorily treated by means of the instant method. In accordance with the formulae set forth above, the amount of vacuum to be initially applied may vary somewhat with respect to different products for different products may have somewhat different freeze points; the time limit as to period of initial subjection to vacuum may vary also within a range of several minutes; the amount of vacuum in order to accomplish the desired moisture removal during the "wait period" will also vary from product to product. At any rate, these variables, in most instances, will fall within ranges herein set forth. When the phrase in this description "at the freeze point" is used, what is meant is that the temperature is preferably as low as possible without substantial freezing or formation of ice within the product. The process is operable during this pre-dehydration "rest" period if the temperature is slightly above freezing. Hence, if 32° F. represent the freeze point the preferred range as to this holding period would be from about 32° F. to about 36° F. Where the freeze point varies from product to product, the desirable range would be, in such instance, from e.g., freeze point to 4° above freeze point.

From the foregoing specific examples of the invention it will be seen that the sequence of treatment involves vacuum dehydration until all of the specific heat of the involved product has been used to boil off the contained water down to the water vapor pressure for the given vacuum, removal of the product from the vacuum zone after freezing temperatures have been reached, placing the product into a hot air blast or other appropriate dehydration means, melting the frozen water by the latter method whereby the product is warmed up to at least its original temperature as initially submitted to the vacuum zone, and further vacuum dehydration and freezing in accordance with the step firstly stated. Alternatively, and preferably, each "Phase A" of the initial vacuum treating cycle involves a delayed period of application of that amount of vacuum (4.6 mm.) which will bring the temperature of the product down to its freeze point and not below, and hence which will also during this appropriate period of time remove as a minimum that amount of moisture as will afford sufficient room for expansion of the ice formed when the product is frozen in Phase B of this cycle.

A primary advantage of the alternating method of dehydration as described herein is the attainment of a better end product, faster and more efficiently reconstituted. The time for treatment, even where several alternate steps of dehydro-freezing and air dehydration are utilized, is substantially and drastically reduced for these reasons: vacuum drying, when the heat is available in the product, rids the product of a significant amount of moisture in but a very few minutes; further, the air drying stage or stages are accomplished in an appreciably lesser period of time than is required for ordinary, conventional air drying, since such vacuum predehydration has created a great number of passageways or interstices as referred to above, the latter affording exit means for the vapor to leave from the center of the product. Accordingly, it is estimated that the air drying stage as herein described is accomplished from 15 to 20% more quickly to obtain the same degree of drying as is obtained by conventional air drying procedures. Hence this 15 to 20% saving in air drying time, in addition to the considerable and significant saving in time due to vacuum predehydration phases result, it is estimated, in an over-all saving of 30 or more percent in total time to attain a given percentage of moisture reduction with respect to a given product.

It is also to be emphasized that the basic concept of this invention is inclusive of an operation where only one vacuum predehydration step (involving dehydration through the "wait" period and freeze stage to utilize the heat of fusion) and one air drying dehydration stage is used. It is of course obvious that after the vacuum cycle, air drying external to the vacuum zone may be effectuated to that extent where any predetermined degree of dehydration is accomplished. However, the application of, e.g., hot air during such subsequent air dehydration phase not only defrosts the product but, after a certain length of time, warms the product to a significant degree as related to the temperature of the air and the time of treatment. On certain products, it may be preferred to subject them to the vacuum treatment a second time. Also if the product is going to be marketed as a dehydro-frozen product it must, at the completion of the entire process, be in its frozen state. In the latter instance a second vacuum dehydration step, after air drying, represents an ideal way to freeze the final end product.

Although the preferred embodiments of the invention are herein set forth, it is to be understood that the invention is not to be limited except as defined by the claims appended hereto.

I claim:

1. In a process for the dehydration of a food product the steps of subjecting said product to vacuum in a vacuum zone, said vacuum being of the order of at least about 4.6 mm. of mercury whereby the product is partially dehydrated and cooled to just above the freeze point thereof due to substantial extraction of the heat of vaporization thereof, maintaining said order of vacuum for that period of time sufficient to remove from about 3% to about 10% of the original moisture content from said product, subjecting said product to a vacuum of about .2 mm. to 5 mm. of mercury whereby said product is dehydrated further and the temperature thereof lowered to below freezing due to substantial extraction of the heat of fusion thereof, said vacuum treatment steps creating open passageways in said product, removing said product from said vacuum zone, subjecting said product exteriorly of said zone to air dehydration at elevated temperature to cause further dehydration thereof by moisture escapement through said passageways, returning said product to said vacuum zone for further dehydration thereof, and resubjecting said product to said about .2 mm. to about 5 mm. of mercury to finally freeze said product.

2. The process as defined in claim 1 wherein said air dehydration is performed at temperatures equivalent to the initial temperature of said product.

3. The process as defined in claim 1 wherein the initial temperature of said product is from ambient room temperature to about 200° F. and said air dehydration step raises said product to at least said initial temperature.

4. In a process for the dehydration of a food product the steps of subjecting said product to a first vacuum in a vacuum zone, said first vacuum being of the order of at least about 4.6 mm. of mercury whereby the product is partially dehydrated and cooled to from about 32° F. to about 36° F. due to substantial extraction of the heat of vaporization thereof, permitting said product to remain in said zone for a period of time sufficient to remove at least about 3% to 15% of the original moisture content of said product whereby expansion space is provided for the ice formed when said product is frozen, subjecting said product to a second vacuum of less than 4.6 mm. of mercury whereby said product is dehydrated further and the temperature thereof lowered to below freezing due to substantial extraction of the heat of fusion thereof, removing said product from said vacuum zone, subjecting said product exteriorly of said zone to air dehydration to cause further dehydration thereof by moisture escapment through said passageways, resubjecting said product to said vacuum zone, maintaining said vacuum in said vacuum zone under a pressure of from about .2 mm. to about .5 mm. of mercury, whereby said product is frozen, and removing said product from said vacuum zone in frozen condition.

5. The process as defined in claim 4 wherein said first and second vacuum steps and said air dehydration step are repeated a sufficient number of times to reduce the moisture content of said product to an amount in excess of about 50% of the original moisture content.

6. In a process for the dehydration of a food product the steps of subjecting said product at a predetermined ingoing temperature to an initial vacuum in a vacuum zone, said vacuum being of the order of from about 4.4 to about 4.6 mm. of mercury for a period of time sufficient to partially dehydrate said product to at least from about 3% to 10% of the original moisture content thereof, whereby space is provided for subsequent ice expansion and the cellular structure of said product is thereby preserved, said amount of vacuum cooling said product to the freeze point thereof due to substantial extraction of the heat of vaporization thereof, subjecting said product to a second vacuum of from about .2 to 5 mm. of mercury whereby said product is dehydrated further and the temperature thereof lowered to below freezing due to substantial extraction of the heat of fusion thereof, said initial vacuum treatment step being for a period of time sufficient to create open passageways in said product, removing said product from said vacuum zone, subjecting said product exteriorly of said zone to further air dehydration by the application of air at elevated temperature thereto, said air temperature being of a degree and said further air dehydration being for a period of time sufficient to raise the temperature of said product to its said predetermined ingoing temperature, replacing said product in said vacuum zone, repeating said initial and second vacuum subjection steps, and removing said product from said vacuum zone in its frozen state.

References Cited by the Examiner
UNITED STATES PATENTS

| | | | |
|---|---|---|---|
| 2,079,514 | 5/1937 | Leetz | 34—5 |
| 2,278,472 | 4/1942 | Musher | 34—5 |
| 2,333,850 | 11/1943 | Dunkley | 34—5 |
| 2,368,811 | 2/1945 | Einarsson | 34—5 |
| 2,400,748 | 5/1946 | Flosdorf | 34—5 |
| 2,435,503 | 2/1948 | Levinson | 34—5 |

ROBERT A. O'LEARY, *Primary Examiner.*

NORMAN YUDKOFF, *Examiner.*